US012473765B2

(12) United States Patent
Mason et al.

(10) Patent No.: US 12,473,765 B2
(45) Date of Patent: Nov. 18, 2025

(54) HINGE ASSEMBLY

(71) Applicant: SGDH, LLC, Grand Prairie, TX (US)

(72) Inventors: Robert Mason, Dallas, TX (US); Lotan Stern, Grand Prairie, TX (US)

(73) Assignee: SGDH, LLC, Grand Prairie, TX (US)

( * ) Notice: Subject to any disclaimer, the term of this patent is extended or adjusted under 35 U.S.C. 154(b) by 410 days.

(21) Appl. No.: 18/052,615

(22) Filed: Nov. 4, 2022

(65) Prior Publication Data

US 2024/0151086 A1 May 9, 2024

(51) Int. Cl.

| | |
|---|---|
| ***E05D 15/24*** | (2006.01) |
| ***E05D 15/16*** | (2006.01) |
| ***E06B 3/48*** | (2006.01) |

(52) U.S. Cl.

CPC ......... *E05D 15/242* (2013.01); *E05D 15/165* (2013.01); *E06B 3/485* (2013.01)

(58) Field of Classification Search

CPC ..... E05D 15/242; E05D 15/165; E06B 3/485; E05Y 2800/422; E04H 12/185

See application file for complete search history.

(56) References Cited

U.S. PATENT DOCUMENTS

| | | | | |
|---|---|---|---|---|
| 2,233,351 A * | 2/1941 | Rowe | E05D 15/242 16/104 |
| 2,525,309 A | 10/1950 | Norberg | |
| 3,921,225 A * | 11/1975 | Suska | E05D 3/02 16/273 |
| 3,950,758 A * | 4/1976 | Mirrione | H01Q 1/08 403/92 |
| 4,135,273 A * | 1/1979 | Holmes | E05D 11/0027 16/388 |
| 4,353,146 A * | 10/1982 | Brockhaus | E05D 5/14 16/385 |
| 4,675,940 A * | 6/1987 | Brockhaus | E05D 5/127 16/385 |
| 5,447,377 A | 9/1995 | Baumgartner et al. | |

(Continued)

OTHER PUBLICATIONS

International Search Report and Written Opinion dated Feb. 28, 2024 in counterpart International PCT Application No. PCT/US2023/078583, pp. 1-14.

*Primary Examiner* — Jason W San
*Assistant Examiner* — Matthew J Jullivan
(74) *Attorney, Agent, or Firm* — Grady K. Bergen; Griggs Bergen LLP

(57) ABSTRACT

A hinge assembly utilizes first and second hinge members. Each hinge member has an attachment body and a pair of laterally spaced apart opposite arms. Each arm has an aperture for receiving a cylindrical member for rotatably coupling the hinge members together so that the hinge members are rotatable about the cylindrical member. The arms of each of the first and second hinge members are spaced apart the same distance, with each arm of having an outer face that faces away from the opposite arm and an inner face that faces the opposite arm. The hinge members are configured so that each arm of each hinge member interfaces with one arm of the other hinge member with the arms of the hinge members being in an offset arrangement wherein the outer face of only one arm of each hinge member interfaces the inner face of only one arm of the other hinge member.

20 Claims, 19 Drawing Sheets

(56) References Cited

U.S. PATENT DOCUMENTS

| | | | | |
|---|---|---|---|---|
| 5,906,029 | A * | 5/1999 | Fox | E05D 5/12 16/221 |
| 6,050,442 | A | 4/2000 | Wysocki | |
| 6,718,595 | B1 * | 4/2004 | Berger, Jr. | E05D 5/14 16/273 |
| 8,006,345 | B1 * | 8/2011 | Bryce | E05D 11/1007 16/285 |
| 9,303,683 | B1 * | 4/2016 | Newcomb, Jr. | E04B 1/34321 |
| 9,394,734 | B1 * | 7/2016 | Berger | E05D 11/02 |
| 9,546,511 | B2 * | 1/2017 | Dittmer | E05D 15/165 |
| 9,856,685 | B1 * | 1/2018 | Kelley | E05D 5/14 |
| 10,280,667 | B2 * | 5/2019 | Kelley | E05D 15/242 |
| 10,280,668 | B2 * | 5/2019 | Kelley | E05D 15/242 |
| 11,131,131 | B2 * | 9/2021 | Kelley | E05D 15/242 |
| 11,180,940 | B2 * | 11/2021 | Kelley | E05D 11/00 |
| 2013/0276265 | A1 | 10/2013 | Friesen et al. | |
| 2015/0101763 | A1 * | 4/2015 | Dittmer | E05D 15/165 160/202 |
| 2020/0190878 | A1 | 6/2020 | Kelley | |
| 2020/0240187 | A1 * | 7/2020 | Wise, Jr. | E05D 15/165 |
| 2024/0376759 | A1 * | 11/2024 | Gracius | E05D 15/242 |

* cited by examiner

HINGE ASSEMBLY

TECHNICAL FIELD

The invention relates to hinges and in particular to hinges used for pivotally securing panels of a garage door together.

BACKGROUND

Overhead garage doors used to enclose large openings of garages or other building structures are typically mounted on rollers provided along either side of the garage door. These rollers are received in tracks stationarily mounted to the walls and/or ceiling of the garage or other supporting structure on either side of the door opening. The garage door is typically moved between a lowered or closed position and a raised or open position. In the lowered or closed position, the garage door is generally oriented vertically to enclose the opening of the garage. In the raised or open position, the garage door is in a generally horizontal position that is clear of the opening and is typically at an elevated position above the opening and floor of the garage so that it is out of the way. Movement of the garage door between these closed and open positions requires the garage door to be turned at an approximate right angle as it is raised and lowered between the horizontal and vertical positions.

To achieve this turn, garage doors are typically formed from multiple rectangular panels that are pivotally coupled together by garage door hinges, so that the garage door can be moved between the open and closed positions. The tracks used to guide the rollers along each side of the garage door are typically curved or arced where the garage door transitions between the vertical and horizontal positions. The garage door panels are sufficiently narrow in width to allow them to accommodate this turn as the rollers are moved within the adjacent tracks, with the hinges providing the necessary pivotal movement between adjacent garage door panels to allow them to continue to move through the turn.

Garage doors used for most residential garages are typically formed from 4 to 8 rectangular panels that extend across the width of the door. Four or more hinges are typically provided between each adjacent pair of panels, with the hinges being spaced apart across the width of the garage door. The hinges along the outer edges of the garage door also typically carry the rollers that are received within the tracks on either side of the garage door to guide them as the door is moved between the open and closed positions.

Conventional garage door hinges used to pivotally couple the garage door panels are typically made of steel or other metal. As the garage door is lifted or lowered, the metal surfaces of the hinge rub against each other. If the metal hinges are not sufficiently lubricated, this often produces an undesirable squeaking or screeching sound as the garage door is raised or lowered. With multiple hinges on each garage door, this can be quite loud and unpleasant to hear.

The garage door hinges are typically formed from three different main components. These include a pair of hinge plates or members that are attached to the surface of the garage door panels and a barrel pin or member that is received and supported by arms of the hinge plates or members. In current garage door hinges, for each hinge the arms of the hinge plates are spaced apart at different distances, with the arms of one hinge plate being spaced closer together than the arms of the other hinge plate. This allows the arms of one hinge plate to be received between the arms of the other hinge plate.

BRIEF DESCRIPTION OF THE DRAWINGS

For a more complete understanding of the embodiments described herein, and the advantages thereof, reference is now made to the following descriptions taken in conjunction with the accompanying figures, in which.

DETAILED DESCRIPTION

Figure 1:
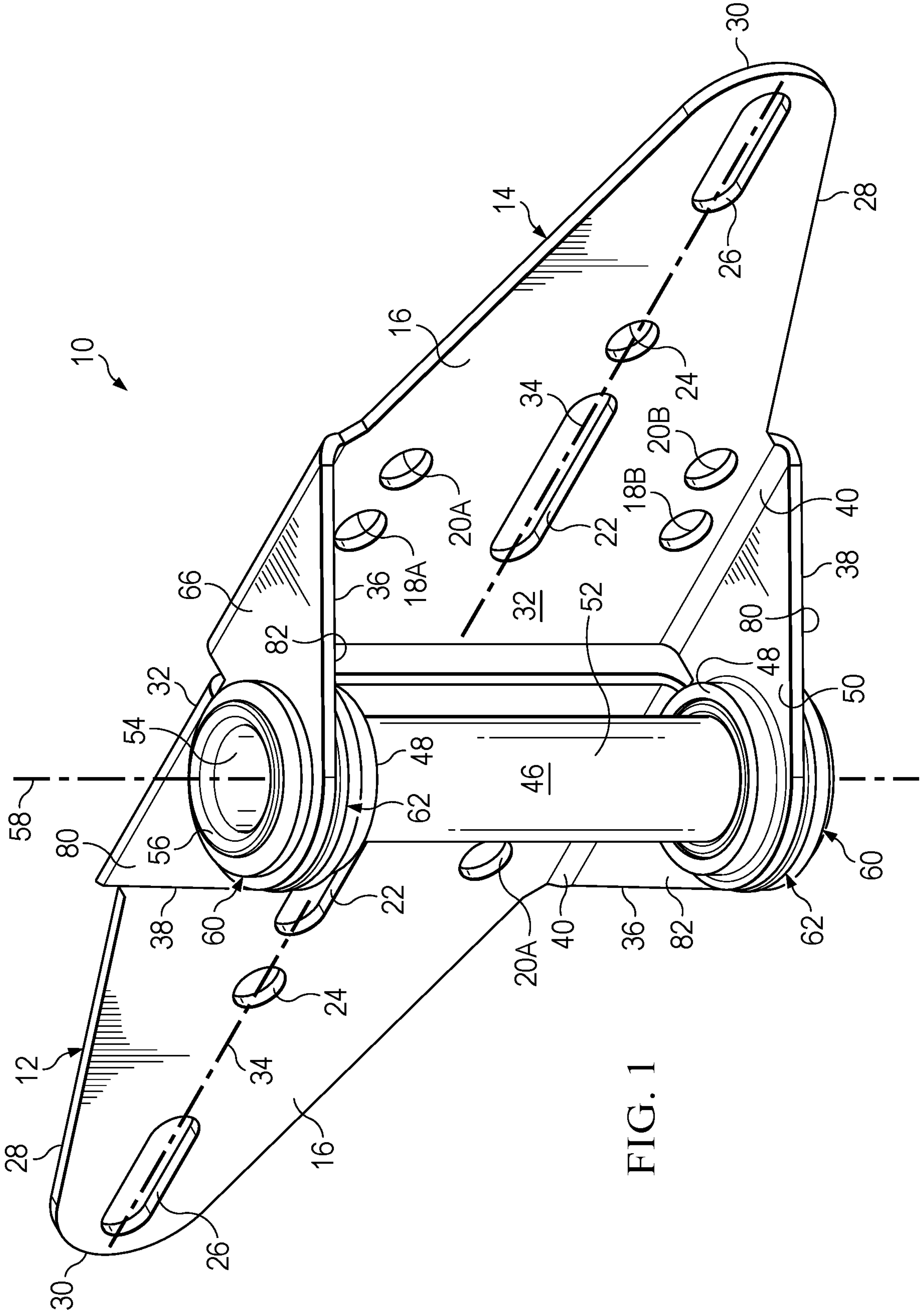
FIG. 1 is a front perspective view of a garage door hinge assembly for mounting to an interior surface of a garage door and constructed in accordance with particular embodiments of the invention.

Referring to FIG. 1, a garage door hinge assembly 10 is shown. The hinge assembly 10 is that used for a garage door to pivotally join two garage door panels together. The hinge assembly 10 is configured for use on an interior position of the garage door that is spaced inward from the side edges or towards the center of the garage door. It may also be used along the side edges of the garage door in certain instances. These hinges are typically referred to or classified as a number "1" hinge and may be so marked to indicate such usage. While the hinge assembly 10 is discussed herein as being used for garage doors it may be used for other non-garage door applications, as well, wherein a hinge is used to pivotally couple two components together.

Figure 2:
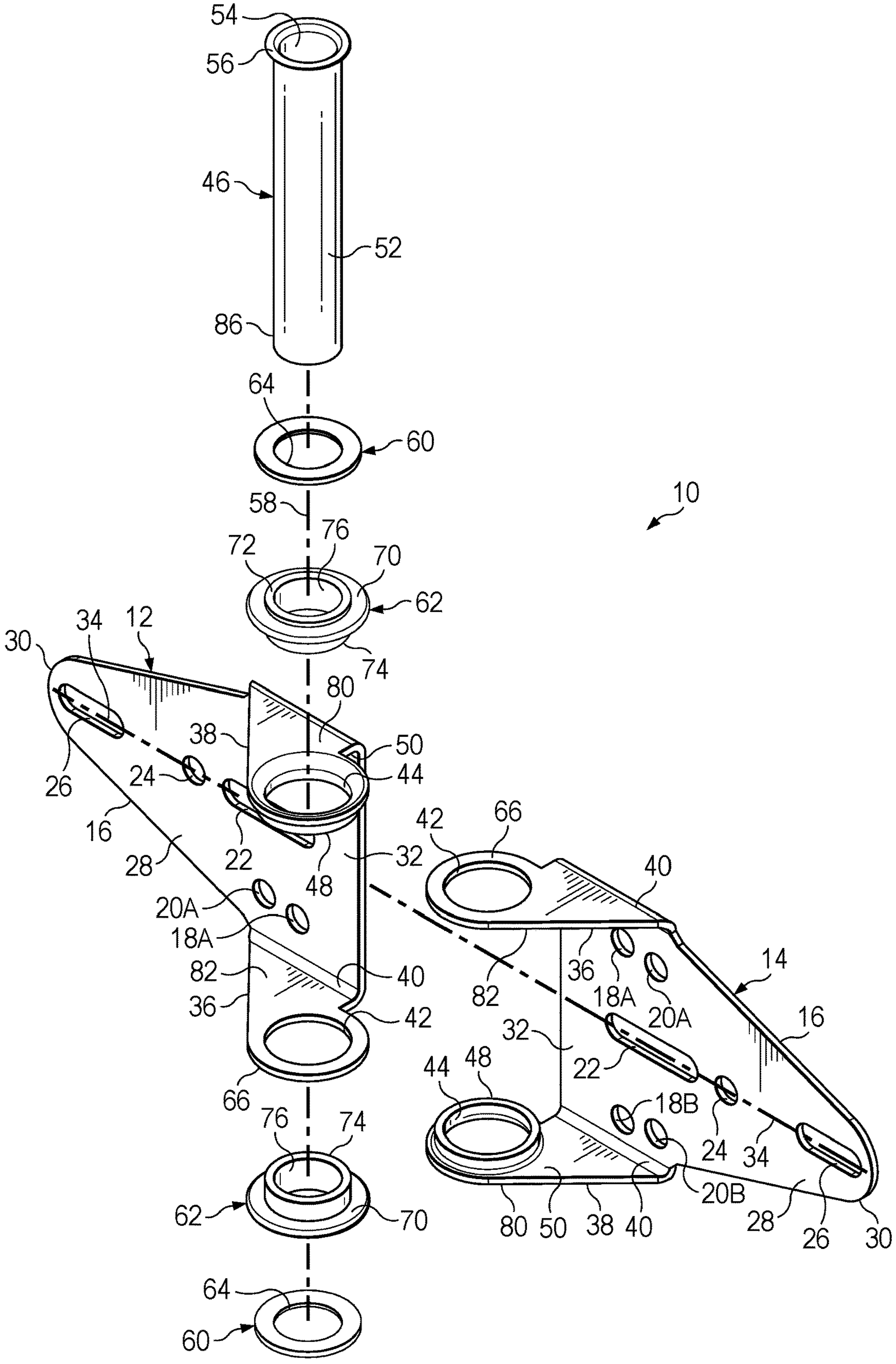
FIG. 2 is a perspective view of the garage door hinge assembly of FIG. 1 prior to assembly, with the components of the hinge assembly shown exploded apart.

As shown in FIG. 2, the hinge assembly 10 is formed from first and second hinge members 12, 14. Each hinge member 12, 14 may be formed from a generally flat piece of sheet or plate metal. Each hinge member 12, 14 has an attachment plate or body 16 with various slots and/or apertures represented at 18A, 18B, 20A, 20B, 22, 24, 26 that extend through the thickness of the plate 16 for receiving fasteners and coupling the hinge members 12, 14 to the surface of a garage door panel (not shown). Unless expressly stated otherwise, similar numbered components are the same for each hinge member 12, 14. Each attachment plate 16 is formed as a generally flat or planar member. While the configuration of the attachment plate 16 may vary, in the embodiment shown the attachment plate has a generally triangular body portion 28 that tapers or narrows in width to a narrow end or tip 30. The opposite or wide end of the triangular body portion 28 joins a rectangular base portion 32, which is in the same plane as the body portion 28.

As can be seen, the apertures 18A, 18B, 20A, 20B, 22, 24, 26 are provided at different spaced apart areas of the triangular and rectangular portions 28, 32, with the slots 22, 26 and aperture 24 being spaced apart and aligned along a line that is parallel to or along a central bisecting longitudinal axis 34 of the attachment plate 16. The apertures 18A, 18B, 20A, 20B are laterally spaced apart on either side of the axis 34. Each of the apertures 18A, 18B, 20A, 20B, 22, 24, and 26 may be offset from the central axis 34. The apertures 18A and 18B of each member 12, 14 correspond to one another and the apertures 20A and 20B of each hinge member correspond to one another but are each offset or spaced apart at different distances from the central axis 34. In other applications, the corresponding apertures 18A, 18B and 20A, 20B may be spaced the same or an equal distance from the central axis 34.

A pair of laterally spaced apart opposite arms 36, 38 project from each attachment plate 16. As shown, the opposite arms 36, 38 may be formed as generally flat or planar members that extend from opposite side edges of the base portion 32. The arms 36, 38 are spaced a non-equal distance from the central axis 34, with one of the arms 36, 38 being closer to the axis 34 and the other being offset or spaced further from the axis 34. In such configuration, the offset arms 36, 38 result in the apertures 18A, 20A of one hinge member 12, 14 being aligned with the corresponding apertures 18B, 20B, respectively, of the other hinge member 12, 14 along a line or in a plane parallel to the central axis 34, when the hinge members 12, 14 are coupled together. The offset slots 22, 26 and aperture 24 of each attachment plate 16 of each member 12, 14 are also aligned with one another along a line or in a plane that is parallel to the central axis 34 when the members 12, 14 are coupled together. The position and configuration of the apertures 18A, 18B, 20A, 20B, 22, 24, 26 may correspond to preformed holes or apertures formed in the garage door panels on which the hinge assembly 10 is mounted. In other embodiments, the arms 36, 38 may be an equidistance or approximate equidistance from the central axis 34, with the apertures 18A, 18B, 20A, 20B, 22, 24, 26 being aligned or non-aligned.

The arms 36, 38 are shown as being parallel to one another and extending at approximately a right angle to the plane of the base portion 32 or attachment plate 16. The attachment plate 16 and arms 36, 38 may be formed from a continuous sheet of plate material that is shaped and formed in the described configuration. As such, the arms 36, 38 may be formed from bending the plate or sheet material extending from the base portion 32 at a linear crease or bend 40 along the side edge of the base portion 32. In the embodiment shown, when the hinge 10 is assembled, the arms 36 constitute outer or exterior arms, while the arms 38 constitute inner or interior arms. As used herein with respect to the arms 36, 38 of the hinge members 12, 14, the expressions "inner," "interior," and like expressions refer to the side or position between or within the space defined by the arms 36, 38, while the expressions "outer," "exterior," and similar expressions refer to the side or position outside of or oriented away from the arms 36, 38. In an alternate configuration of assembly (not shown), arms 36 may constitute inner or interior arms, while arms 38 may constitute outer or exterior arms.

The material forming the hinge members 12, 14 or components thereof may be steel or other metal material that has sufficient structural strength and rigidity to provide the necessary functionality to serve as a garage door hinge, as described herein. The metal may be coated or treated, such as with a powder or galvanized coating, to protect the hinge components from rust, oxidation, or the like. The metal hinge materials for the hinge members 12, 14 may be those having a gauge thickness of any one of 10, 11, 12, 13, 14, 15, 16, 17, 18, or 20 gauge. The selected thickness may depend upon the application and type of door the hinge is to be used on, such as a residential or commercial garage door. The thickness of the hinge members 12, 14 or its components may be uniform or non-uniform. In some embodiments, the hinge members 12, 14 may be formed from durable non-metal materials, such as rigid polymeric or non-metal composite materials.

Each arm 36, 38 has an aperture or opening 42, 44, respectively, formed through the thickness of the arms 36, 38. The openings 42, 44 may be formed as circular openings that are concentrically aligned with and parallel to one another. The openings 42, 44 are configured for receiving a cylindrical member or hinge tube 46, which is described in more detail herein. As shown, the aperture 44 on interior arm 38 of each hinge member 12, 14 includes an annular projecting lip or collar 48 that projects a distance from the inner surface of the arm 38 towards the opposite arm 36. The annular lip or collar 48 may be continuous or non-continuous. In certain embodiments, the lip or collar 48 may have a height above the surrounding surface of the arm 38 of from at least, equal to, and/or between any two of 0.05 inch, 0.06 inch, 0.07 inch, 0.08 inch, 0.09 inch, 0.11 inch, 0.12 inch, 0.13 inch, 0.14 inch, 0.15 inch, 0.16 inch, 0.17 inch, 0.18 inch, 0.19 inch, 0.20 inch, 00.21 inch, 0.22 inch, 0.23 inch, 0.24 inch, 0.25 inch, 0.26 inch, 0.27 inch, 0.28 inch, 0.29 inch, and 0.30 inch. The lip or collar 48 may be formed from the surrounding material of the arms 38 by metal shaping means, such as a stamping or pressing the material of the arm 38 so that it projects from the surrounding inner surface or face 50 of the arm 38. Other means for forming the lip or collar 48 may also be used.

The cylindrical or tubular member 46 forms a pivot pin or axle around which the hinge members 12, 14 pivot. The cylindrical member 46 may be formed from an elongated, cylindrical tubular body 52. The cylindrical member 46 has a length sufficient to extend across the spaced apart arms 36, 38 when the hinge members 12, 14 are coupled together. The cylindrical member 46 has a central opening or passage 54 that extends along all or a portion of the length of the tubular body 52. In other embodiments, the cylindrical member 46 may be a solid member with no central opening or passage. As shown, the cylindrical member 46 is flared at one end with a continuous or non-continuous annular flange 56 that projects or flares radially outward from the tube body 52. The flange 56 may be formed by metal shaping techniques, such as stamping or pressing. The cylindrical tube or member 46 has a central longitudinal axis 58 that passes through the center of member 46 along its length.

The hinge assembly 10 is provided with a pair of washers 60 and a pair of washer or bushing members 62. Each washer 60 is configured as a flat ring having central circular opening 64 with a diameter sized to receive the tubular body 52 of cylindrical member 46. In the assembly of the hinge 10, one of the washers 60 overlays the opening 42 of each arm 36, with an inner surface of the washer abutting against the outer face 66 of the arm 36 immediately surrounding the opening 42.

Each washer or bushing 62 includes a flat, annular washer portion 70. A short outward projecting annular sleeve 72 may be provided on the bushing 62 that projects from an outer face of the washer portion 70. The outer sleeve 72 is configured so that when the hinge 10 is assembled, the sleeve 72 projects through the aperture 42 of one of the arms 36. The sleeve 72 may therefore have a height approximately equal to or slightly less or greater than the thickness of the area of arm 36 surrounding the opening 42. In some embodiments, the short sleeve 72 may project from a distance of from at least, equal to, or between any two of 0.02 inch, 0.03 inch, 0.04 inch, 0.05 inch, 0.06 inch, 0.07 inch, 0.08 inch, 0.09 inch, 0.11 inch, 0.12 inch, 0.13 inch, 0.14 inch, and 0.15 inch from the outer surface of the washer portion 70. In other embodiments, no sleeve 72 is provided on the bushing 62.

The bushing 62 is also provided with an inward projecting annular sleeve 74 that projects from the inner face of the washer portion 70. The sleeve 74 is configured so that when the hinge 10 is assembled, the sleeve 74 projects from the inner face of the washer portion 70 into the aperture 44 of one of the arms 38 and into the collar 48 of the aperture 44. The sleeve 74 may therefore have a height approximately equal to or slightly less or greater than the combined thickness of the arm 38 in the area surrounding the aperture 44 and the height of the collar 48. In certain embodiments, the inward projecting sleeve 74 may project from the inner surface of the washer portion 70 a distance of from at least, equal to, and/or between any two of 0.05 inch, 0.06 inch, 0.07 inch, 0.08 inch, 0.09 inch, 0.11 inch, 0.12 inch, 0.13 inch, 0.14 inch, 0.15 inch, 0.16 inch, 0.17 inch, 0.18 inch, 0.19 inch, 0.20 inch, 00.21 inch, 0.22 inch, 0.23 inch, 0.24 inch, 0.25 inch, 0.26 inch, 0.27 inch, 0.28 inch, 0.29 inch, 0.30 inch, 0.31 inch, 0.32 inch, 0.33 inch, 0.34 inch, 0.35 inch, 0.36 inch, 0.37 inch, 0.38 inch, 0.39 inch, 0.40 inch, 00.41 inch, 0.42 inch, 0.43 inch, 0.44 inch, and 0.45 inch.

A continuous central, cylindrical interior passage 76 of the washer or bushing 62 extends through the washer portion 70 and the outward and inward projecting annular sleeve portions 72, 74 to form an interior bearing surface of the washer or bushing 62. The inner passage 76 of the bushing 62, as well as the opening 64 of the washer 60, may be sized and configured to closely receive the tubular body 52 of cylindrical member 46 to provide a snug fit, but with a sufficient clearance to allow free rotation of the tubular body 52 within the passage 76.

Any or all of the washers 60 and/or bushings 62 or portions thereof may be formed from non-metal materials. These may include polymeric materials, such as acetyl polymers (e.g., Delrin® acetyl plastic), acrylonitrile butadiene styrene (ABS), nylon, polyester, polypropylene, polyethylene (e.g., UHMWPE), PTFE, etc. Other non-polymeric and non-metal materials, such as composite and fiber materials, may also be used. Such materials may facilitate reduction of friction between metal surfaces and provide non-metal bearing surfaces that reduce or prevent noise between the moving components of the hinge assembly 10.

Figure 3:
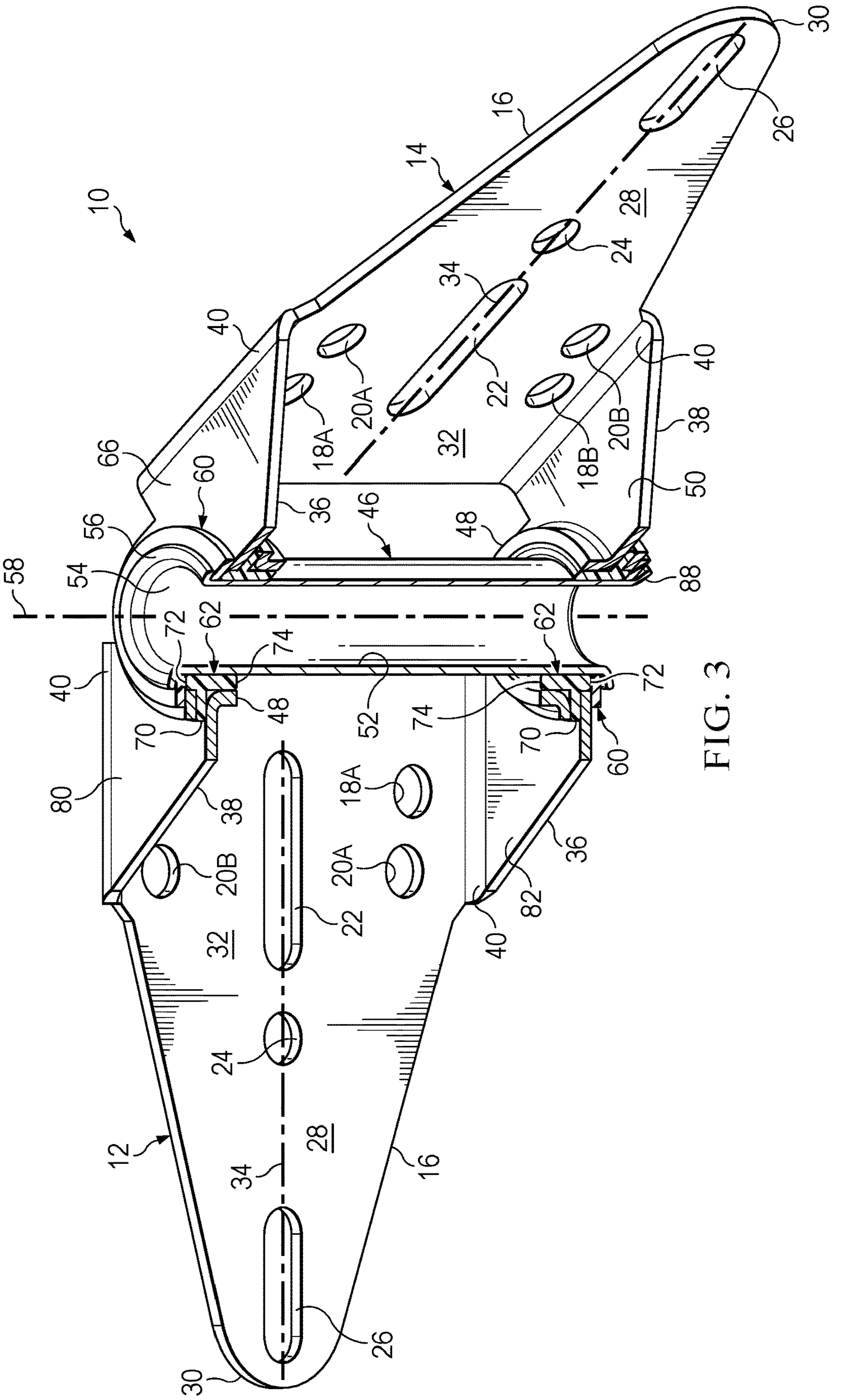
FIG. 3 is a perspective view of the garage door hinge assembly of FIG. 1, with portions of hinge arms and tubular member shown in cross section.

In the embodiment shown in FIGS. 1-3, each of the first and second hinge members 12, 14 is identical to the other, with the arms 36, 38 of each hinge member 12, 14 being spaced apart the same or an equal distance. When the hinge assembly 10 is assembled, each exterior arm 36 of each hinge member 12, 14 interfaces with the interior arm 38 of the other hinge member. The outer face of only one arm of each hinge member 12, 14 therefore interfaces with the inner face of only one arm of the other hinge member when the hinge members 12, 14 are coupled together upon the cylindrical member 46, with the arms 36, 38 being in a staggered or offset arrangement. Thus, the outer face 80 of interior arm 38 of hinge member 12 interfaces with the inner face 82 of exterior arm 36 of hinge member 14. Likewise, the outer face 80 of interior arm 38 of hinge member 14 interfaces with the inner face 82 of exterior arm 36 of hinge member 12. The arms 36 of each hinge member 12, 14 therefore constitutes outer arms of the hinge 10, while the arms 38 of each hinge member 12, 14 constitute inner arms of the hinge 10. When in this arrangement, the central axis 34 of each hinge member 12, 14 will also be laterally offset or spaced from the other along the axis 58 of the tubular member 46.

Referring to FIGS. 2 and 3, in assembly of the hinge 10, the sleeve 74 of one of the washers or bushings 62 is inserted into the aperture 44 and collar 48 of each of the inner arms 38 of each hinge member 12, 14. The hinge members 12, 14 are brought together in a staggered or offset configuration, with the inner face 82 of the exterior arms 36 interfacing with the outer face 80 of the exterior arms 38 as previously described, so that the apertures 42, 44 of the arms 36, 38 are concentrically aligned. The apertures 42 of each exterior arm 36 are positioned over the outer sleeve 72 of the bushing 62 and the sleeve 72 is received within the aperture or opening 42. The washers 60 are positioned over the outer face of the exterior arms 36 of each hinge member 12, 14, with the opening 64 of the washers 60 aligned with the apertures 42.

With the arms 36, 38 of hinge members 12, 14 so aligned and the washers 60 and bushings 62 in position, as described, the cylindrical member or tube 46 is passed from one side of the hinge 10 through the aligned apertures 42, 44, washers 60 and bushings 62. The flange 56 at the end of the tube 46 will then rest on and abut against on the outer surface of the first washer 60 through which the tubular member 46 is fully inserted to prevent further passage of the member 46. When fully inserted, the non-flanged end 86 (FIG. 2) of the tubular member 46 will project a distance from the other side of the hinge assembly 10. A continuous or non-continuous annular flange 88 (FIG. 3), similar to the flange 56, that projects radially outward can then be formed with a flange-forming tool to fully secure the tubular member 46 to the hinge members 12, 14, coupling them and the various components of the hinge 10 together. The flange 88 may be formed to crimp or force the components (i.e., washers 60, washer portion 62, arms 36, 38) together along the tubular member 46 so that they are snuggly held together with no or very little play along the longitudinal axis 58 of the tubular member 46, while allowing free rotation or pivotal movement of the hinge members 12, 14 about the tubular member 46.

The assembled hinge 10 may then be coupled to the panels of a garage door by securing each attachment plate 16 of each hinge member 12, 14 to a different adjacent panel of the garage door using suitable fasteners (not shown) received within one or more of the openings 18A, 18B, 20A, 20B, 22, 24, 26 so that the panels can move or rotate relative to one another about the hinge 10.

The described hinges are strong and durable. As can be seen in FIG. 3, the non-metal washers 60 and bushings 62 cover all interfacing metal surfaces of the hinge assembly 10 to prevent any metal surfaces of the hinge arms 36, 38 and/or the cylindrical member 46 from coming into contact or rubbing against one another. This makes the garage hinges 10 much quieter than conventional garage door hinges where the metal surfaces typically bear against one another. The non-metal washers and bushings may also reduce friction to provide smoother movement of the hinge.

The hinge assembly 10 may be used at both interior positions and along the outer side edges of the garage door, with the central opening 54 of the hinge tube 46 receiving a roller shaft of a garage door roller assembly when used along the outer side edges.

Figure 4:
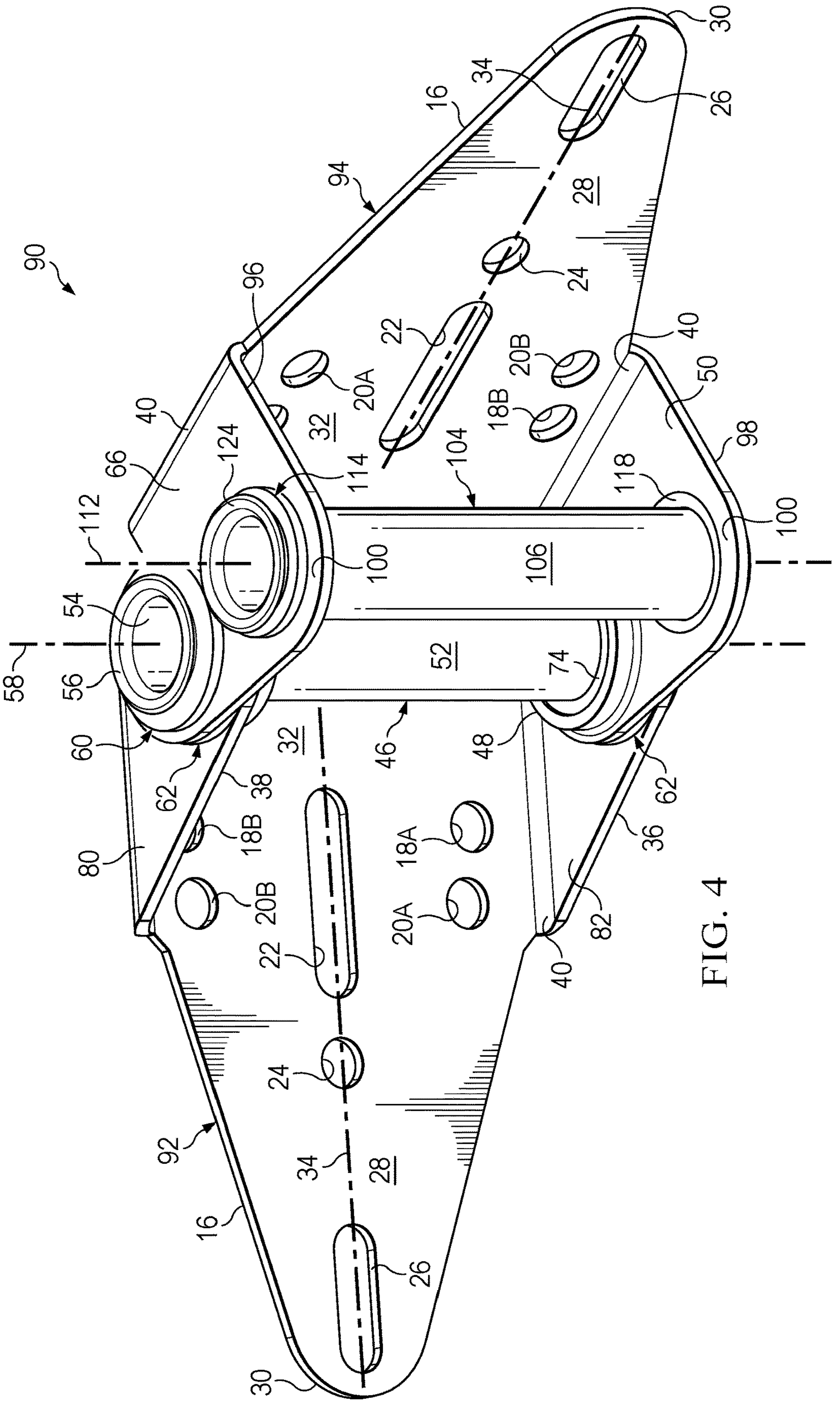
FIG. 4 is a front perspective view of a garage door hinge assembly for mounting along the side of a garage door with a roller tube having a central opening for receiving a shaft of a garage door roller assembly, constructed in accordance with particular embodiments of the invention.

Referring to FIG. 4, another hinge assembly 90 is shown. The hinge assembly 90 is like the hinge assembly 10 with similar components labeled with the same reference numerals. The hinge 90 differs from that of the hinge 10 in that it is configured with a second tubular body for use along the outer side edge of the garage door for receiving a roller shaft of a garage door roller assembly (not shown) that engages the garage door tracks (not shown) located along either side of the garage door. The hinge assembly 90 is representative of all such hinge assemblies carrying such rollers. Depending upon the panels with which the hinge 90 is used there may be slight differences where the roller shaft is positioned upon the hinge 90. These hinges are typically numbered in consecutive integers from 2 to 12, which may be so marked to indicate such usage and to distinguish them from one another.

The hinge assembly 90 is formed from cooperating hinge members 92, 94. The hinge member 92 is configured the same or similarly to the hinge members 12, 14 of the hinge assembly 10 and may even be identical to the hinge members 12, 14.

Figure 5:
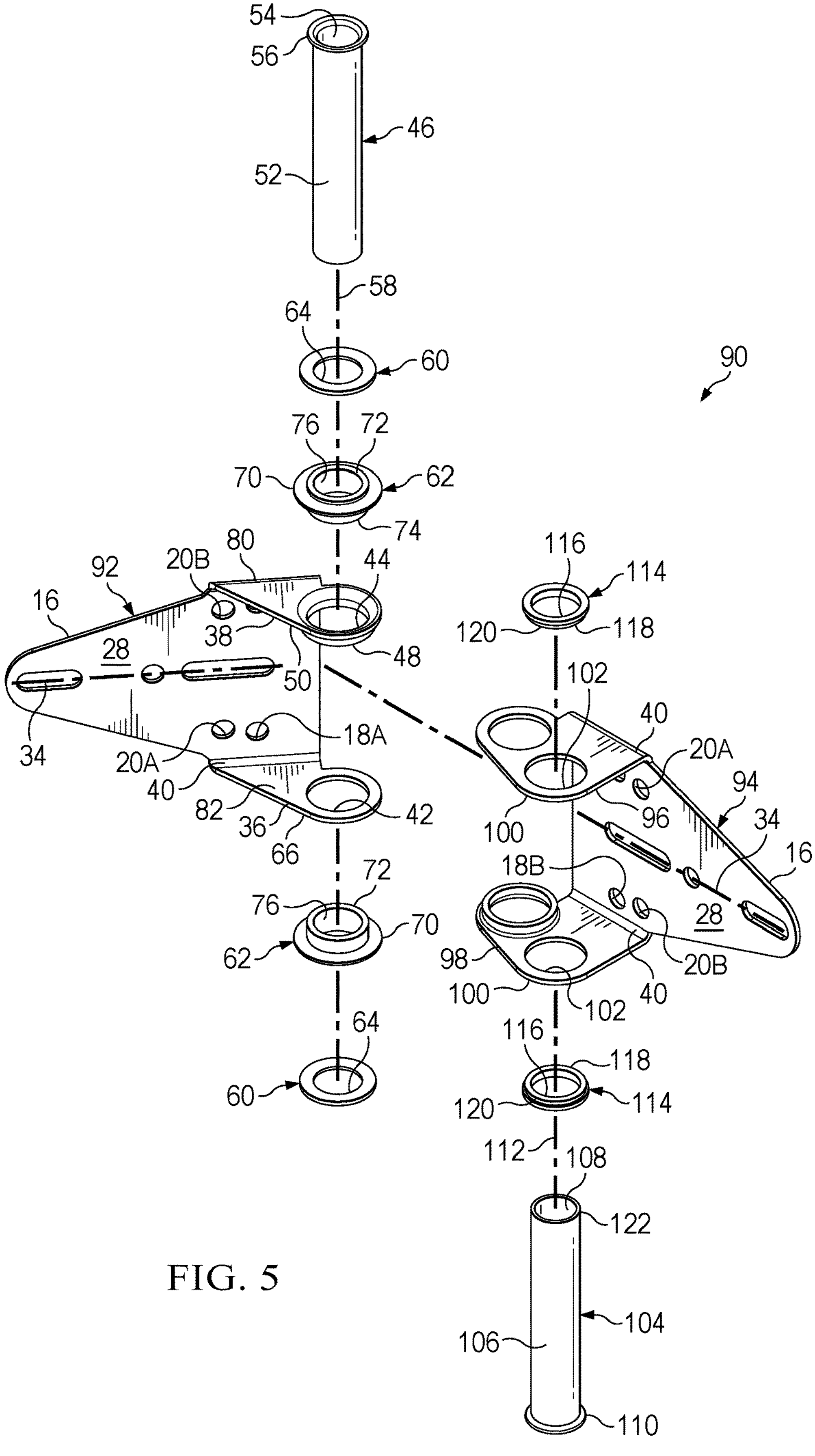
FIG. 5 is a perspective view of the garage door hinge assembly of FIG. 4, with the components of the hinge assembly shown exploded apart.
Figure 6:
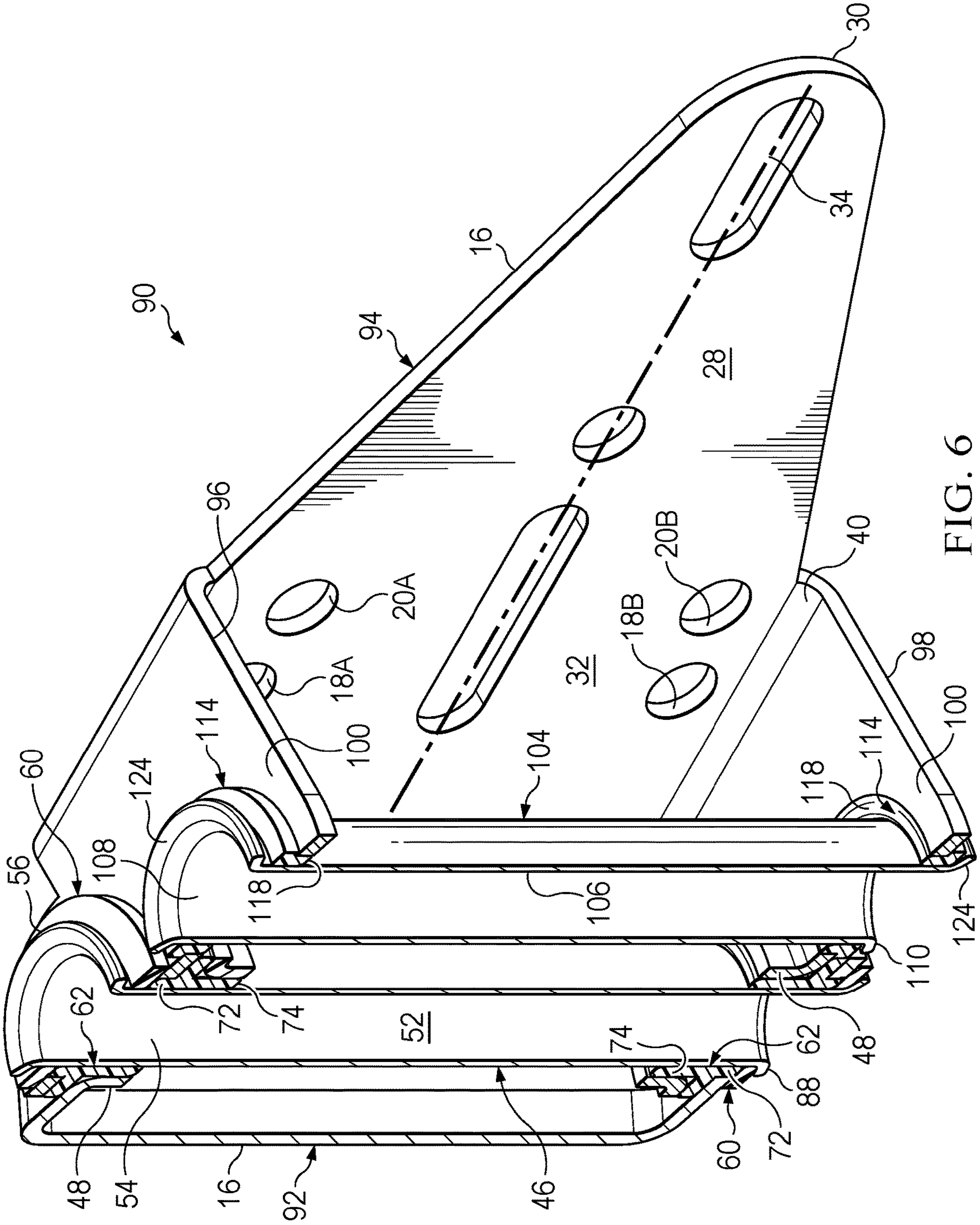
FIG. 6 is a perspective view of the garage door hinge assembly of FIG. 4 prior to assembly, with portions of hinge arms, hinge tube and roller tube shown in cross section.

Referring to FIGS. 5-6, the hinge member 94 is similar to the hinge member 92 but constitutes a roller hinge member wherein the arms 96, 98 of the hinge member 94 are configured slightly differently from the arms 36, 38 of hinge member 92 to accommodate a roller shaft. The arms 96, 98 of hinge member 94 are still spaced apart the same or an equidistance to the arms 36, 38 of the cooperating hinge member 92. The arm 96 constitutes and exterior arm and the arm 98 constitutes an interior arm. The arms 96, 98 are also provided with similar configured apertures or openings 42, 44 to the arms 36, 38 of hinge member 92, including the use of the inward projecting collar 48 on interior arm 98.

The arms 96, 98 are parallel to one another and differ from the arms 36, 38 of hinge member 92 in that the arms 96, 98 are each provided with an extended arm area 100 that is provided with a circular roller aperture or opening 102. The roller openings 102 of each arm 96, 98 are concentrically aligned and laterally spaced apart from the openings 42, 44. The extended areas 100 and openings 102 are configured and arranged so that the position of the openings 102 relative to the attachment plate 16 may vary depending upon the type and position the hinge 90 will be used on the garage door. This position may vary for each numbered garage door hinge 2-12.

In the embodiment shown, the hinge member 94 may be provided with a roller tube 104. The roller tube 104 is typically formed as a cylindrical tubular body 106 that has a central opening or passage 108 that extends along all or a portion the length of the tubular body 106. As shown, the roller tube 104 is flared at one end by a continuous or non-continuous annular flange 110 (FIG. 5) that projects or flares radially outward from the tube body 106. The flange 110 may be formed by metal shaping techniques, such as stamping or pressing. The cylindrical tube 104 has a central longitudinal axis 112 that passes through the center of tube 104 along its length.

A pair of washers 114 may be provided with the hinge 90 for use with the hinge member 94. The washers 114 may be formed from the same or similar non-metal materials to those previously described for washers 60 and bushings 62. The washers 114 are each configured as a flat ring having central circular opening 116 with an interior diameter sized and configured to closely receive the tubular body 106 of the roller tube 104. This may provide a snug or tight fit to stationarily hold the roller tube 104 in place or it may be a loose or slightly loose fit that allows free or some degree of rotation of the tubular body 106 within the opening 116. In some embodiments, the washer 114 may be a stepped washer have a reduced outer diameter collar or inwardly stepped portion 118 that is received and sized to fit within the openings 102 of each arm 96, 98. The collar 118 may have a height that is approximately the same, or slightly less or greater (e.g., ±0.001 inch to 0.01 inch) than the thickness of the area of the extended portion 100 immediately surrounding the openings 100.

The wider outer diameter portion of the washer 114 adjacent to the collar 118 defines a inner washer face 120 that is wider than the openings 102 and interfaces and seats or abuts against the outer face or surface of the extended area 100 of each arm 96, 98 immediately surrounding the openings 102.

Except for the addition of the roller tube 104, the assembly of the hinge 90 is the same or similar to the assembly of hinge 10, as previously described. To assemble the roller tube 104 with the hinge 90, the washers 114 are positioned over the openings 100, with the collars 118 being received within the openings 102 and the washer face 120 of each washer 114 seating or abutting against the outer face of one of the arms 96, 98.

The tubular body 106 is then inserted from one side of the hinge member 94 into the openings 102 of the arms 96, 98 and the openings 116 of the washers 114. The flange 110 at the end of the roller tube 104 will then rest on and abut against on the outer surface of the washer 114 through which the tubular body 106 is fully inserted to prevent further passage of the roller tube 104. When fully inserted, a non-flanged end 122 (FIG. 5) of the roller tube 104 will project a distance from the other side of the hinge member 94. A continuous or non-continuous annular flange 124 (FIG. 6), similar to the flange 110, that projects radially outward can then be formed with a flange-forming tool to fully secure the roller tube 104 to the arms 96, 98 of the hinge member 94. The flange 124 may be formed to crimp or force the washers 114 against the exterior of the arms 96, 98 so that roller tube 104 is securely held in place.

The hinge assembly 90 may then be secured to adjacent panels of a garage door along the outer side edges of the door. The shaft of a roller assembly (not shown) may be inserted into opening 108 of the roller tube 104 before or after the hinge assembly 90 is mounted to the garage door.

It should be noted that in some embodiments, the roller tube 104 may be eliminated from the hinge 90. In such cases, the openings and apertures 102 of the arms 96, 98 of the hinge member 94, with or without washers 114, may be sized and configured to directly receive and carry the shaft of a roller assembly without any roller tube.

The hinge 90 has similar advantages to those described for the hinge 10. The hinges are strong and durable. The non-metal washers and/or bushings reduce friction and prevent the contact or rubbing of metal surfaces of the hinge to reduce or eliminate noise. Because the hinge 90 utilizes a hinge member 92 that may be the same or identical to the other hinge members 12, 14, this also may reduce manufacturing costs, since the hinge member 92 can be used in combination with other hinge members 94 without altering their configuration.

Figure 7:
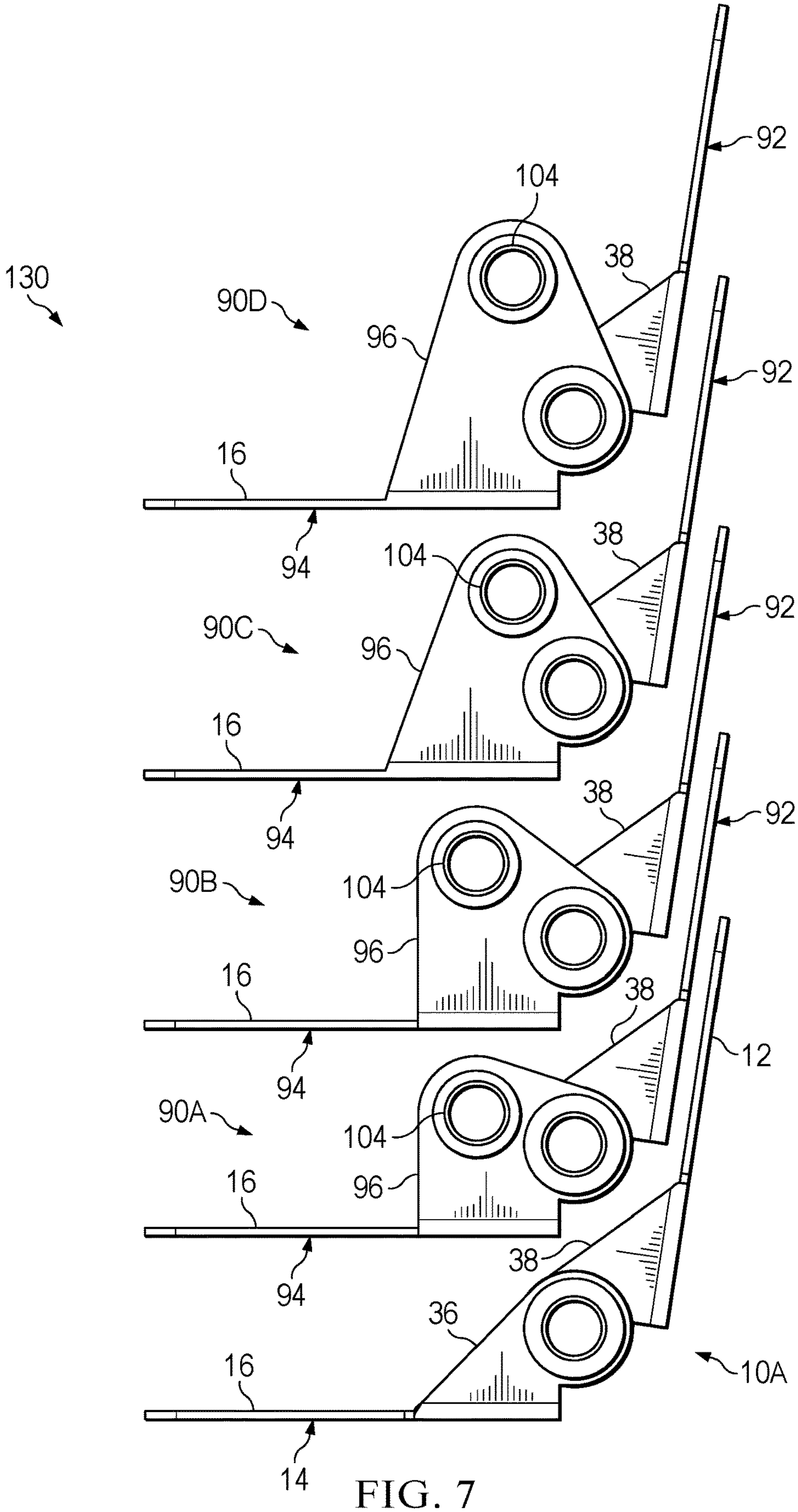
FIG. 7 is a side elevational view of a set of garage door hinges for pivotally coupling garage door panels of a garage door to one another.
Figure 8:
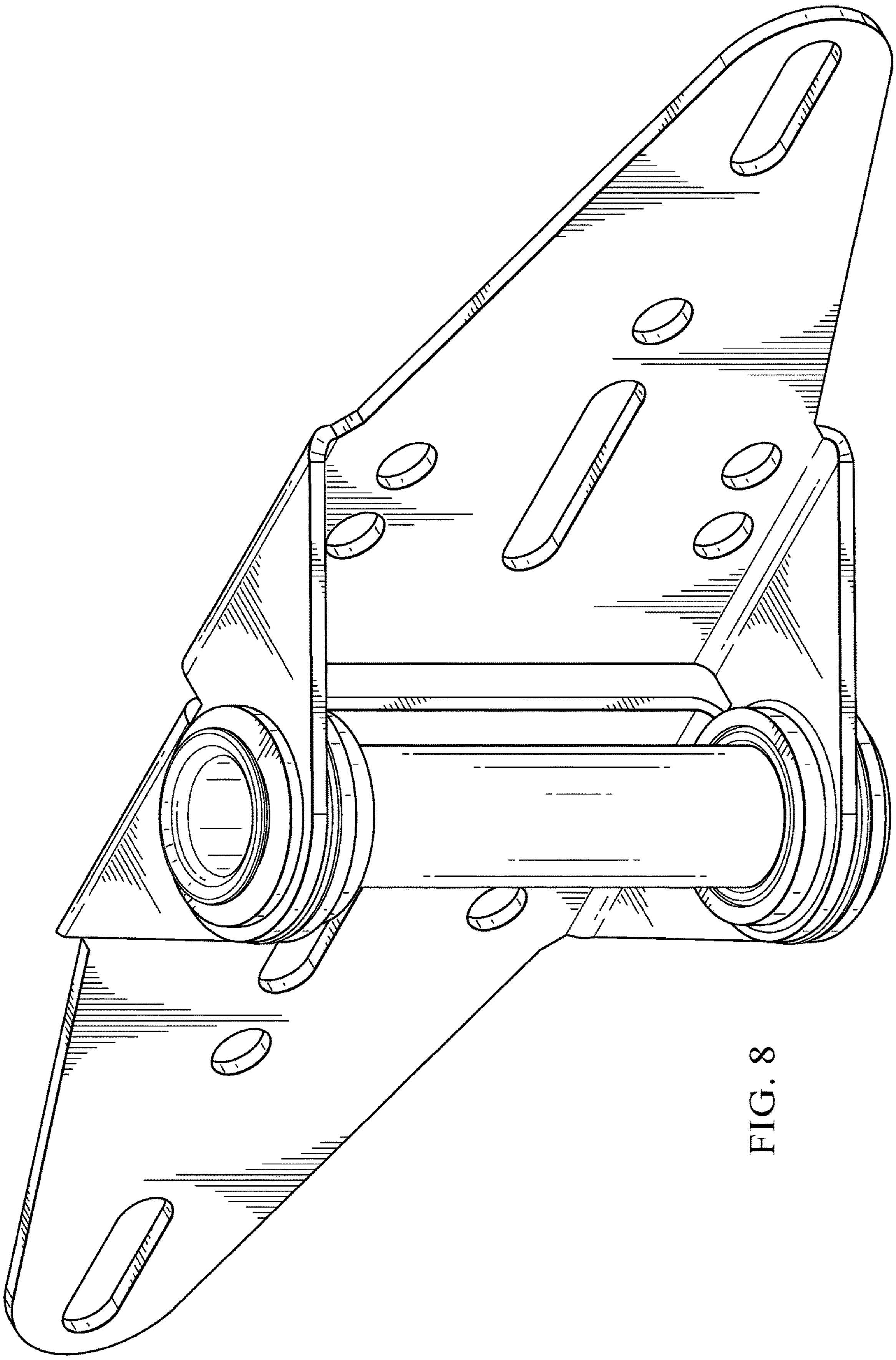
FIG. 8 is an additional front perspective view of the garage door hinge assembly of FIG. 1.
Figure 9:
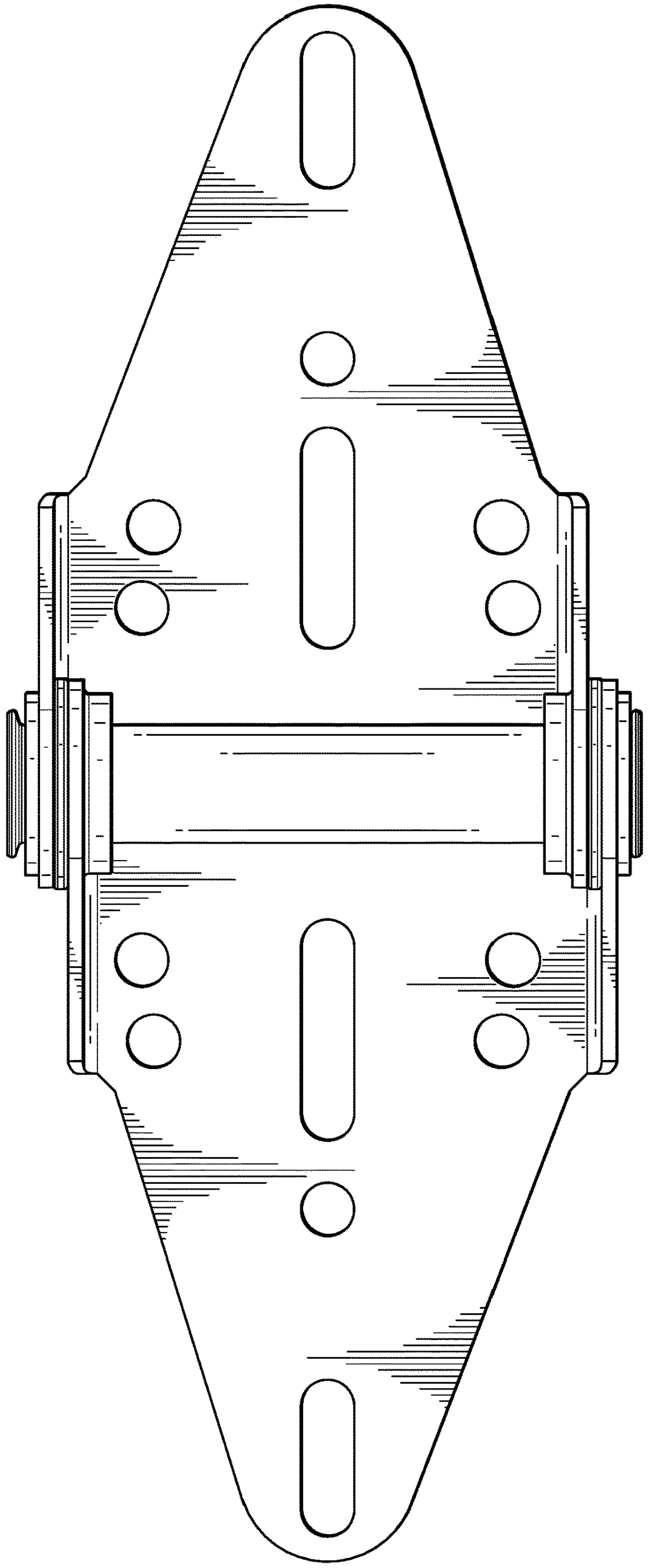
FIG. 9 is a front elevational view of the garage door hinge assembly of FIG. 8.
Figure 10:
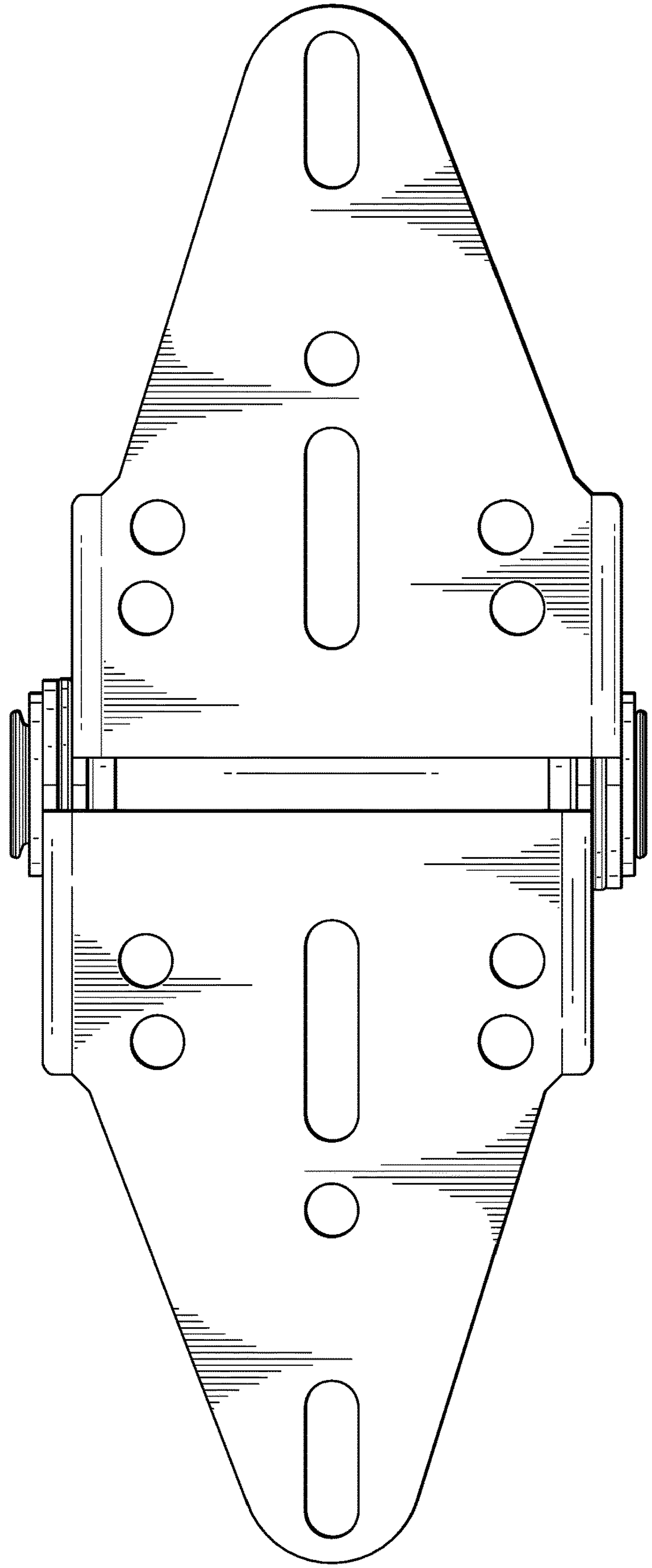
FIG. 10 is a rear elevational view of the garage door hinge assembly of FIG. 8.
Figure 11:
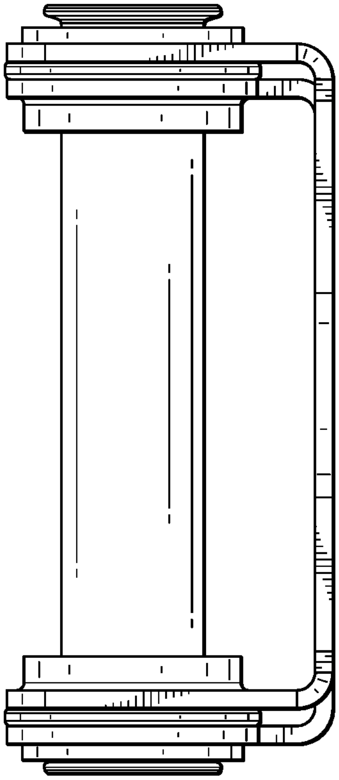
FIG. 11 is a right-side elevational view of the garage door hinge assembly of FIG. 8.
Figure 12:
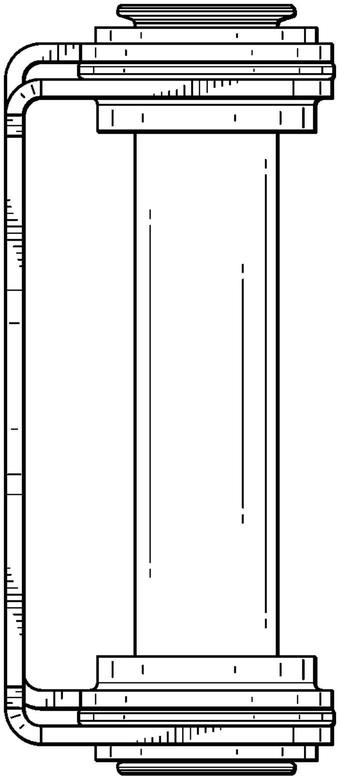
FIG. 12 is a left-side elevational view of the garage door hinge assembly of FIG. 8.
Figure 13:
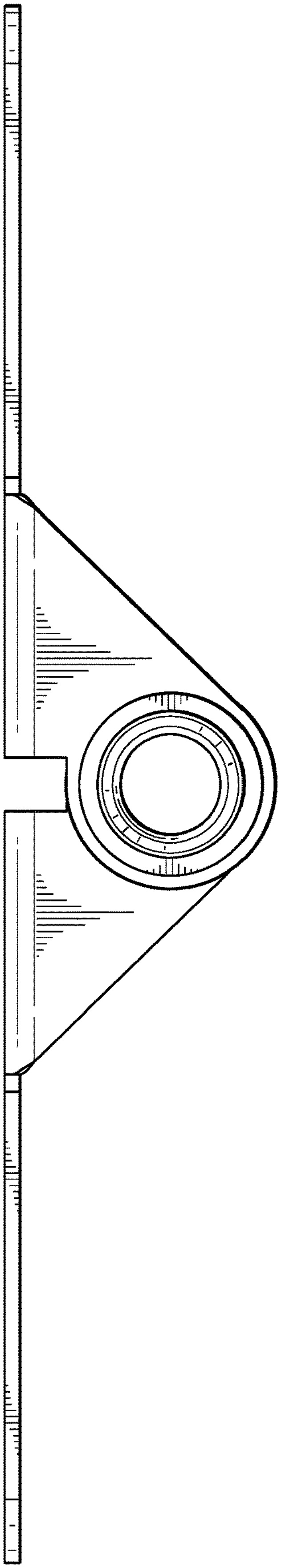
FIG. 13 is a top plan view of the garage door hinge assembly of FIG. 8.
Figure 14:
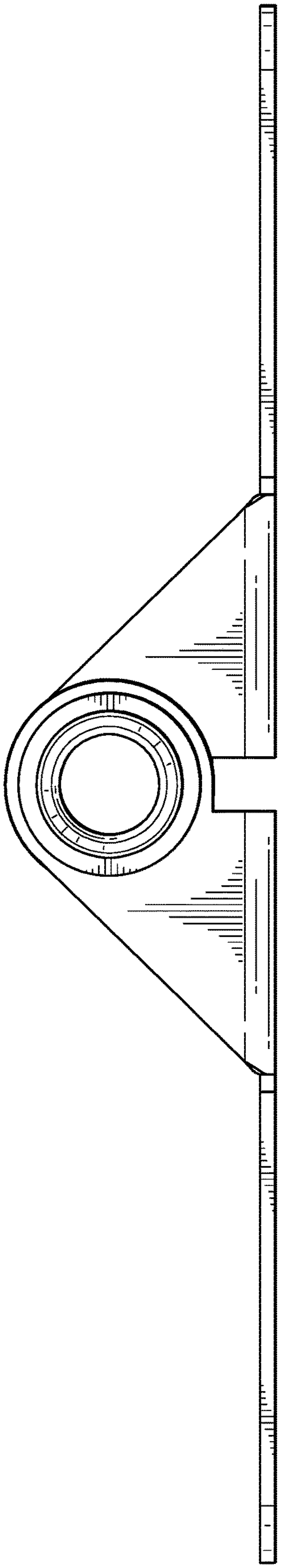
FIG. 14 is a bottom plan view of the garage door hinge assembly of FIG. 8.
Figure 15:
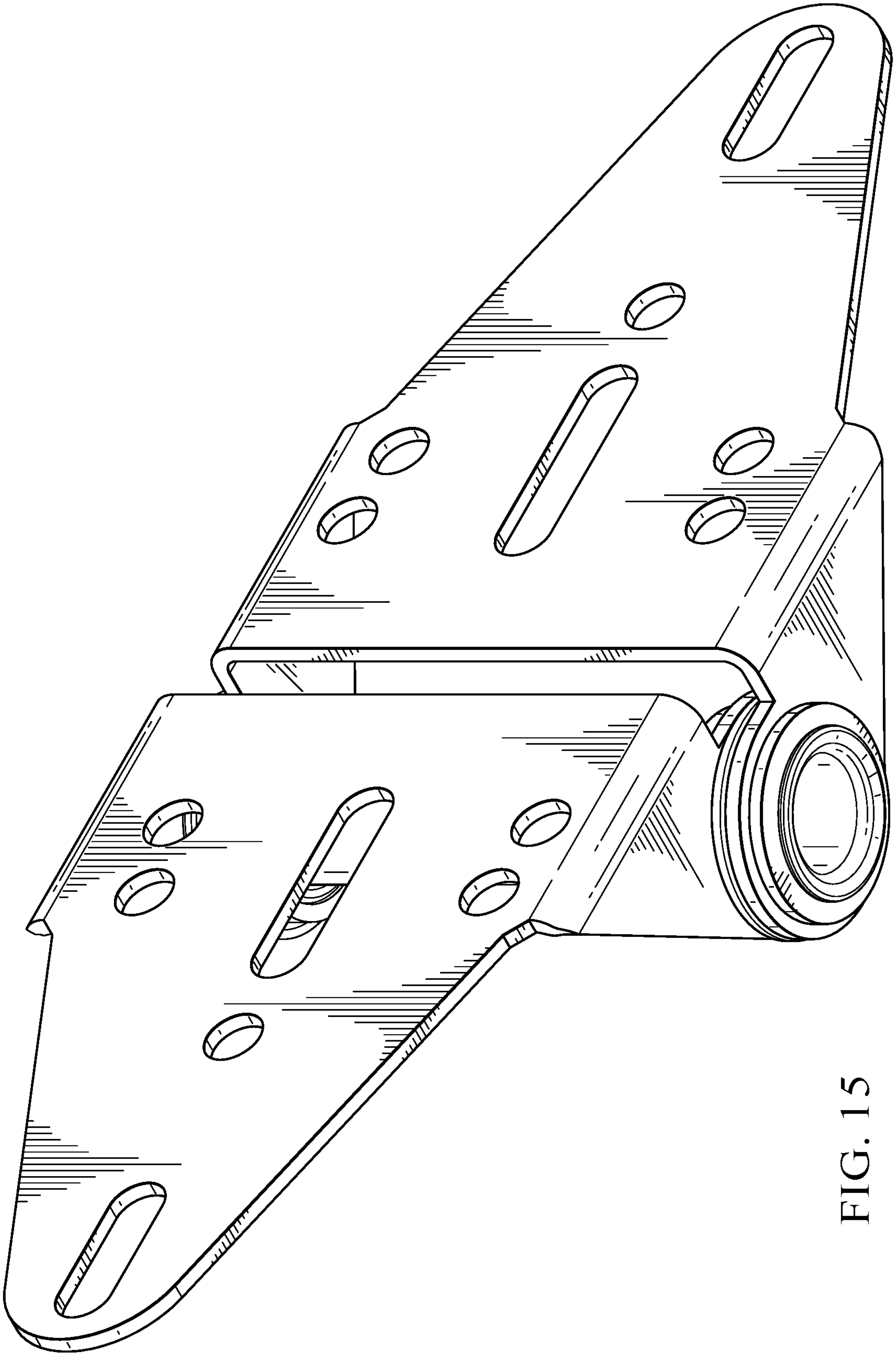
FIG. 15 is a rear perspective view of the garage door hinge assembly of FIG. 8.
Figure 16:
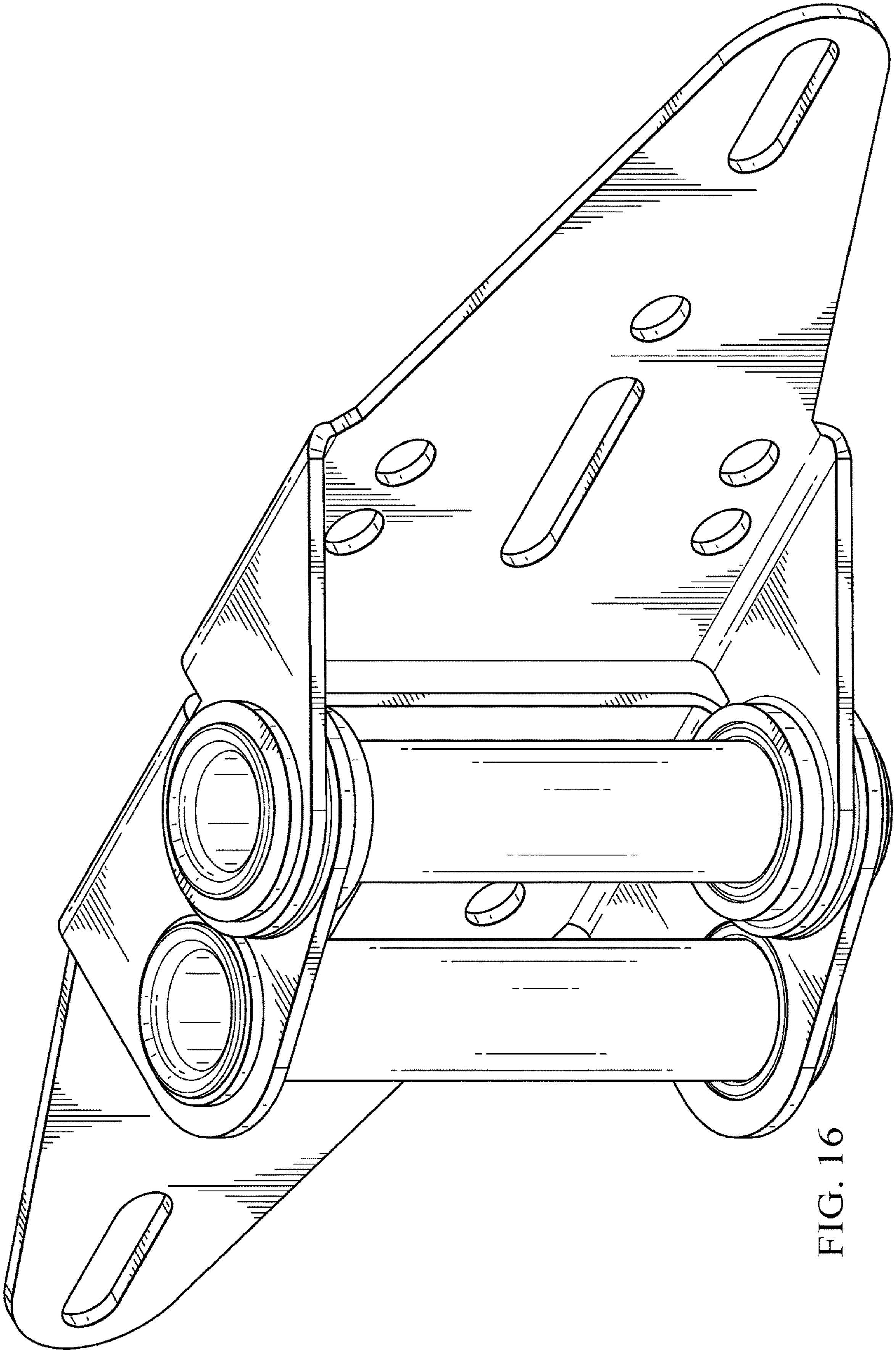
FIG. 16 is an additional front perspective view of the garage door hinge assembly of FIG. 4.
Figure 17:
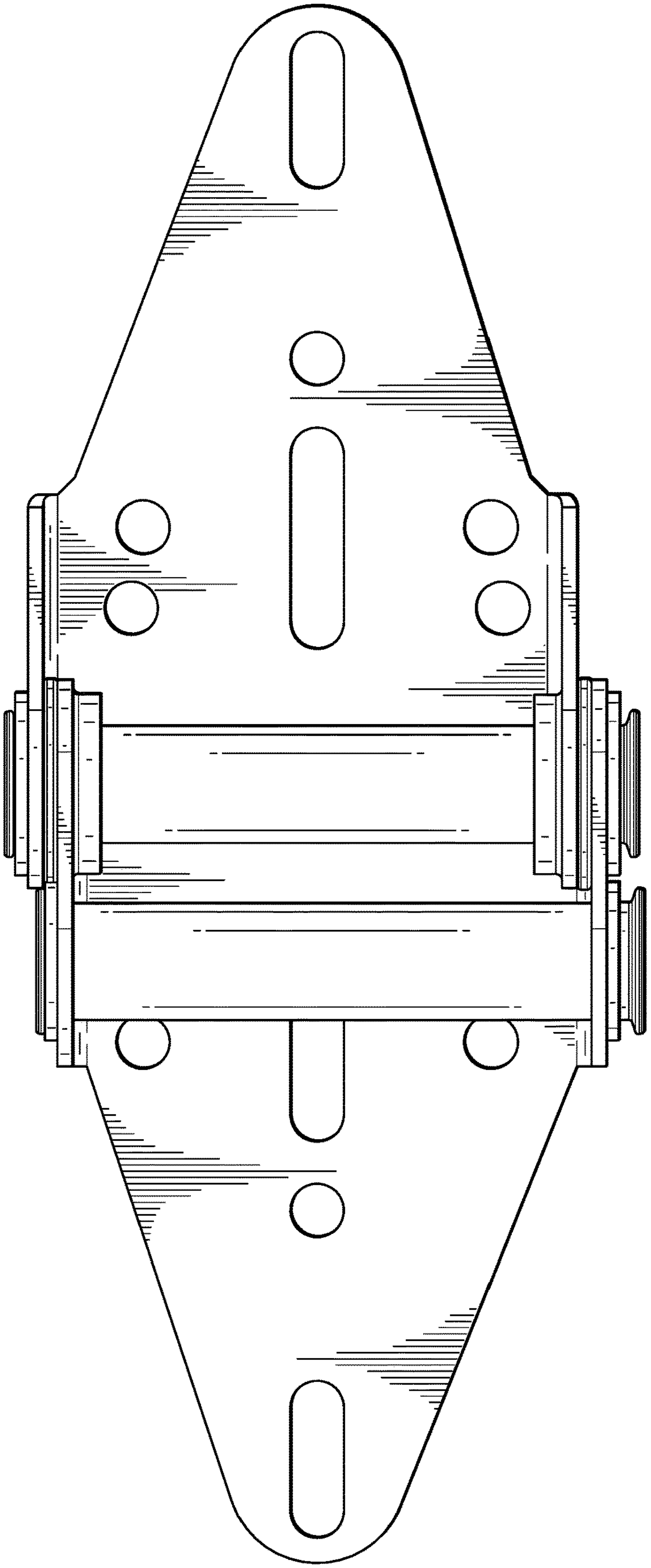
FIG. 17 is a front elevational view of the garage door hinge assembly of FIG. 16.
Figure 18:
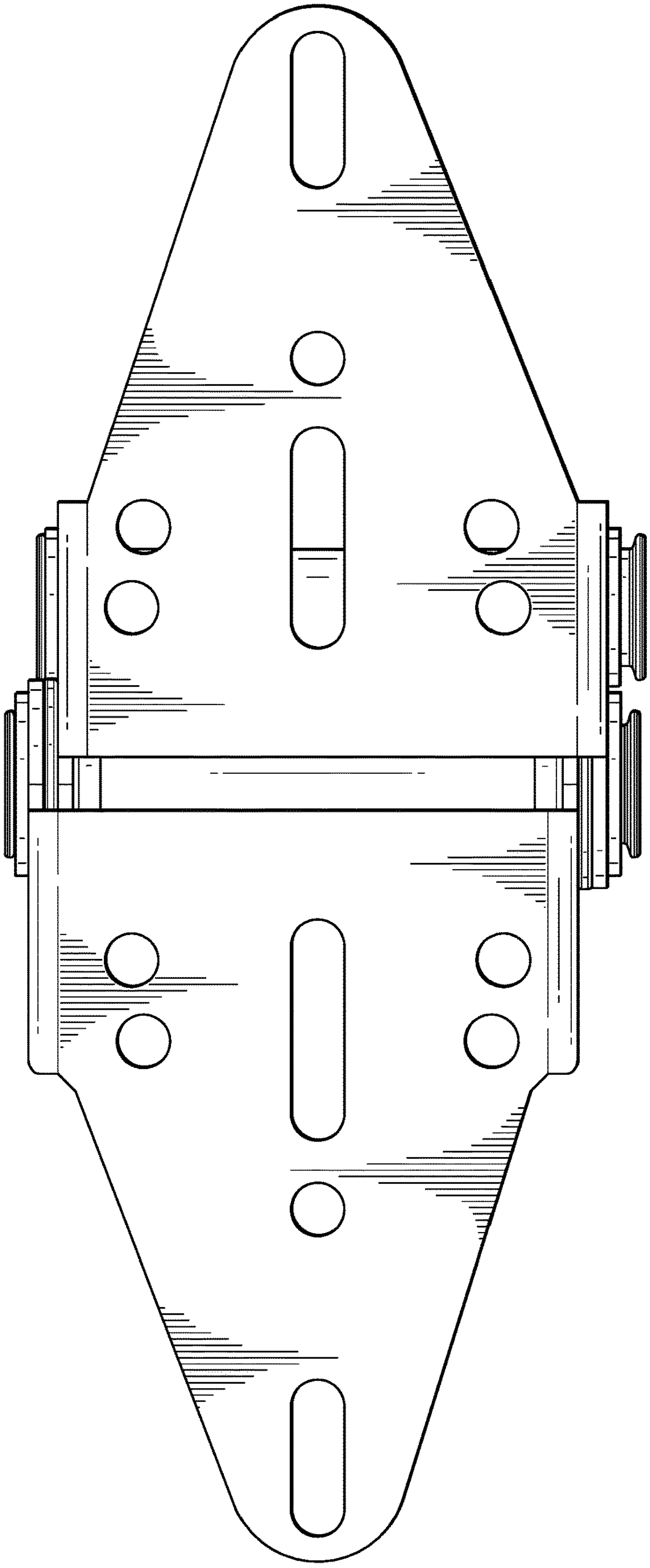
FIG. 18 is a rear elevational view of the garage door hinge assembly of FIG. 16.
Figure 19:
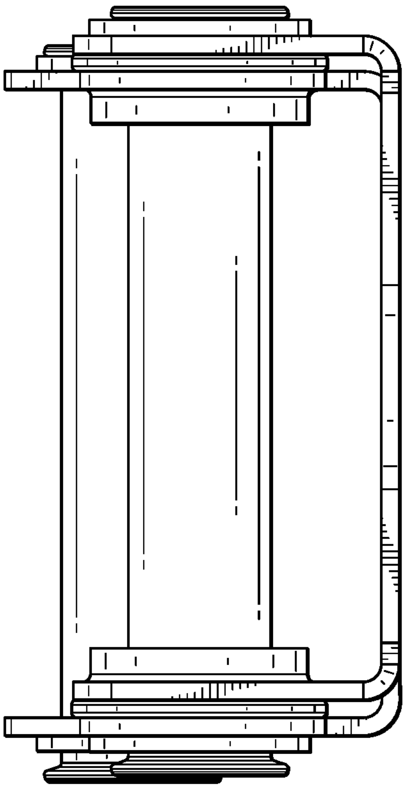
FIG. 19 is a right-side elevational view of the garage door hinge assembly of FIG. 16.
Figure 20:
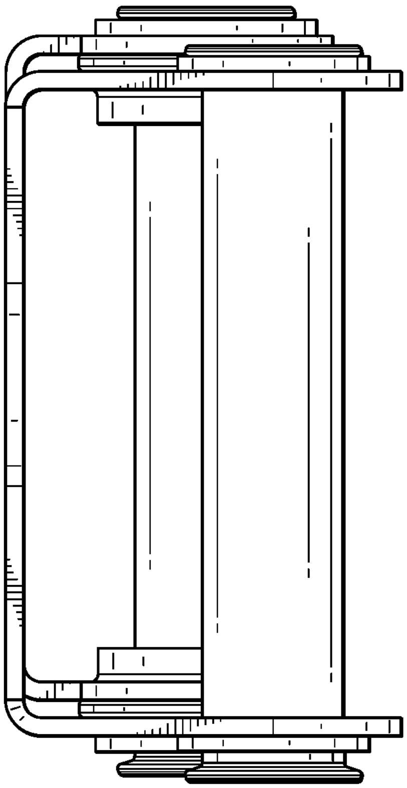
FIG. 20 is a left-side elevational view of the garage door hinge assembly of FIG. 16.
Figure 21:
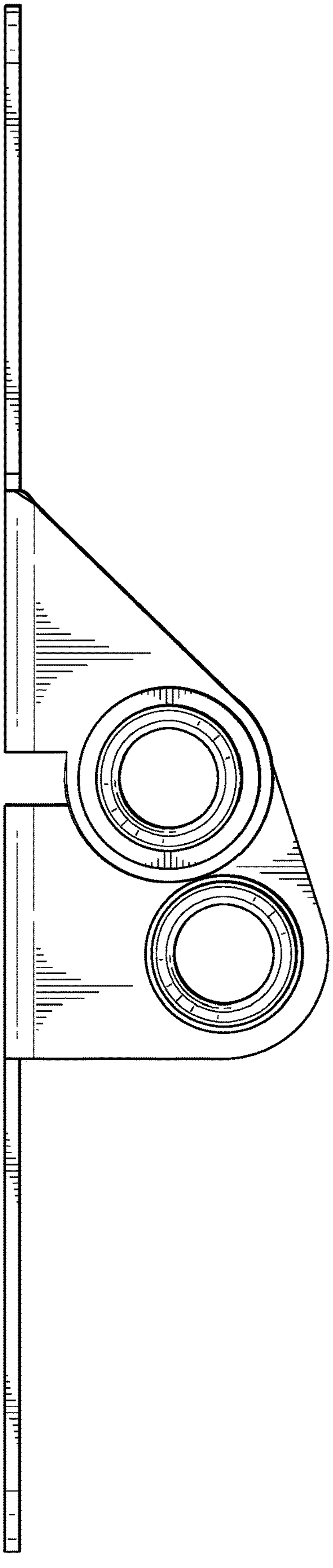
FIG. 21 is a top plan view of the garage door hinge assembly of FIG. 16.
Figure 22:
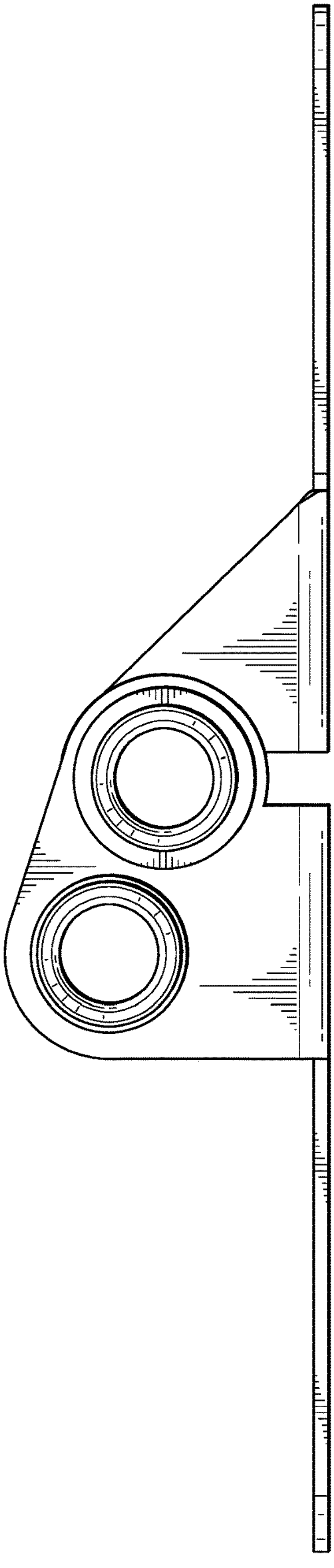
FIG. 22 is a bottom plan view of the garage door hinge assembly of FIG. 16.
Figure 23:
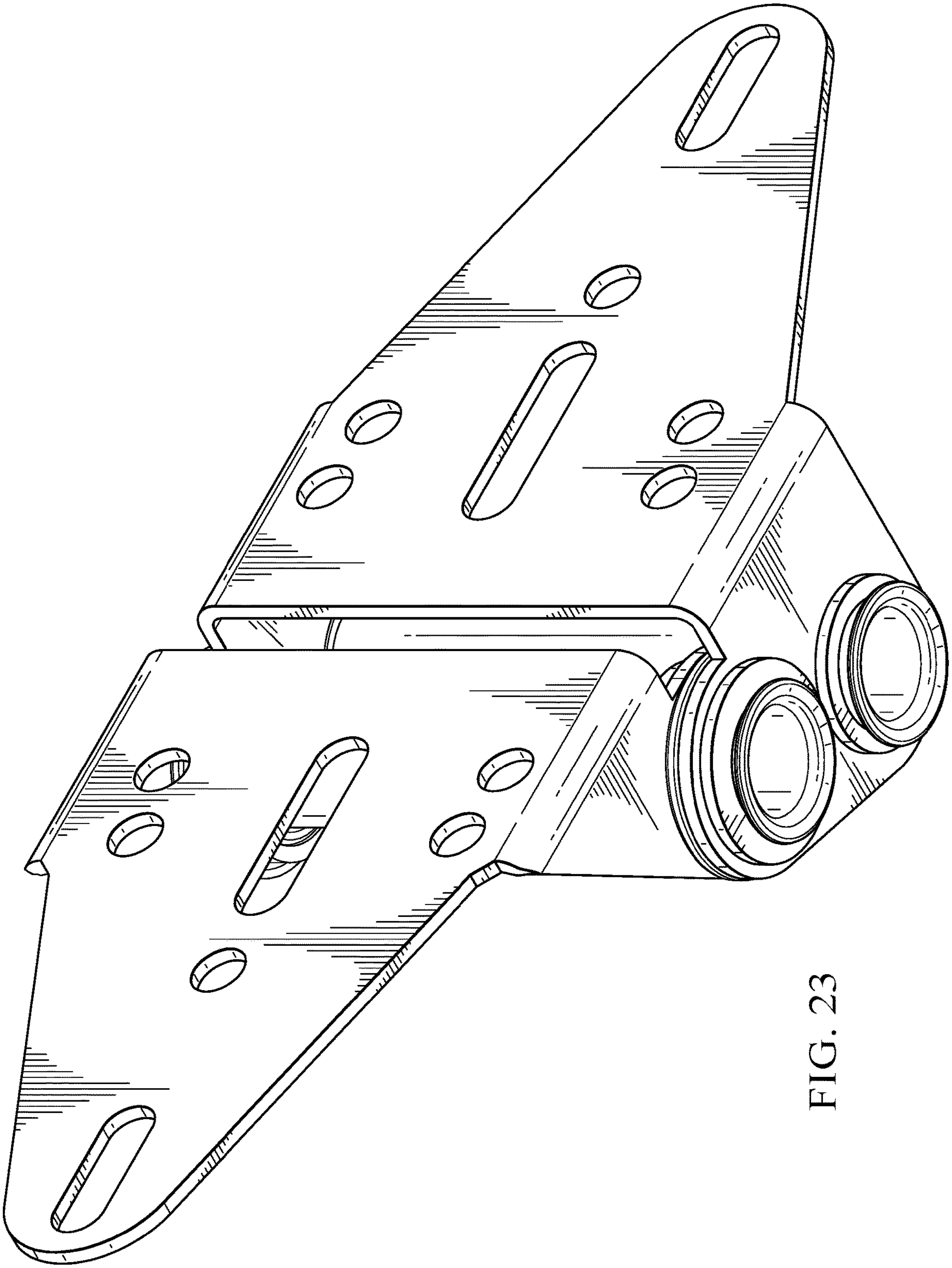
FIG. 23 is a rear perspective view of the garage door hinge assembly of FIG. 16.

FIG. 7 shows a representative set 130 of garage door hinges. The set 130 may be provided as a kit that is a complete or partial set of garage door hinges, with or without a garage door or garage door panels, and which may include fasteners, rollers, tracks, etc. As shown, the set 130 may include one or more number 1 hinges 10A that is/are constructed the same or similar to the hinge 10 of FIGS. 1-3, previously described, for use in the center or interior portions of the garage door.

In addition, the set 130 may also include one or more of each of number 2-12 garage door hinges for use with the outer edges of the garage door that are used to carry the roller assemblies. In the embodiment shown, the set 130 includes one or more of the garage door hinges 90A, 90B, 90C, 90D, which may correspond to number 2-5 garage door hinges, respectively. The garage door hinges 90A, 90B, 90C, 90D may be configured the same or similarly to the garage door hinge 90 of FIGS. 4-6, previously described. FIG. 7 more clearly shows the different position of the roller tube 104 that is carried within the openings 102 in relation to the attachment plate 16 of each hinge member 94 for suitable positioning of the rollers that correspond to the number 2-5 garage door hinges.

FIGS. 8-23 show additional views of garage door hinge assemblies of embodiments of the invention. The garage door assemblies shown in FIGS. 8-23 include ornamental designs that also form part of the invention.

While the invention has been shown in some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A hinge assembly for pivotally coupling structures to one another, the hinge assembly comprising:

a structural cylindrical member having a central axis;

first and second hinge members, each hinge member having an attachment body for coupling to a structure and a pair of laterally spaced apart opposite arms that project from the attachment body, each arm having an aperture for receiving the cylindrical member and rotatably and structurally coupling the hinge members together upon the cylindrical member so that the hinge members are rotatable about the central axis of the cylindrical member, the arms of each of the first and second hinge members being spaced apart the same distance, each arm of each hinge member having an outer face that faces away from the opposite arm and an inner face that faces the inner face of the opposite arm, and wherein the first and second hinge members are configured so that each arm of each hinge member interfaces with one arm of the other hinge member with the arms of the hinge members being in a staggered or offset arrangement wherein the outer face of only one arm of each hinge member interfaces the inner face of only one arm of the other hinge member when the hinge members are coupled together upon the cylindrical member.

2. The hinge assembly of claim 1, wherein:

the hinge assembly is a garage door hinge assembly; wherein the cylindrical member and arms of the hinge members are formed from metal; and further comprising:

at least one non-metal washer or bushing comprising a flat washer portion, an outer annular sleeve that projects from an outer face of the washer portion, and an inner annular sleeve that projects from an inner face of the washer portion, the outer annular sleeve projecting into the aperture of one of the arms of the hinge members and the inner annular sleeve projecting into the aperture of the other hinge member, wherein the at least one non-metal washer or bushing is interposed between the arms of the hinge members and the cylindrical member so that no metal surfaces of the cylindrical member and arms of the hinge members are in contact with one another.

3. The hinge assembly of claim 1, wherein:

the hinge assembly is a garage door hinge assembly; wherein the arms of the hinge members are formed from metal; and further comprising:

at least one flat non-metal washer is interposed between each of the interfacing inner and outer faces of the arms of hinge members so that no metal surfaces of the interfacing arms of the hinge members are in contact with one another.

4. The hinge assembly of claim 1, wherein:

the hinge assembly is a garage door hinge assembly; wherein the cylindrical member and arms of the hinge members are formed from metal; and further comprising:

at least one non-metal washer or bushing comprising a flat washer portion, an outer annular sleeve that projects from an outer face of the washer portion, and an inner annular sleeve that projects from an inner face of the washer portion, the outer annular sleeve projecting into the aperture of one of the arms of the hinge members and the inner annular sleeve projecting into the aperture of the other hinge member, wherein the at least one non-metal washer or bushing is interposed between the arms of the hinge members and the cylindrical member; and at least one flat non-metal washer interposed between each of the interfacing inner and outer faces of the arms of hinge members; and wherein the at least one non-metal washer or bushing and the at least one flat non-metal washer are configured so that no metal surfaces of the cylindrical member and arms of the hinge members are in contact with one another.

5. The hinge assembly of claim 1, wherein:

one arm of each hinge member has an inner projecting collar that surrounds the cylindrical member when the hinge members are coupled together upon the cylindrical member.

6. The hinge assembly of claim 1, wherein:

each hinge member has an identical configuration to the other hinge member.

7. The hinge assembly of claim 1, further comprising:

a cylindrical barrel pin having a central opening for receiving a shaft of a garage door roller assembly, the cylindrical barrel pin being separate from the cylindrical member; and wherein the arms of one of the first and second hinge members are provided with openings that are laterally spaced from the apertures for receiving the cylindrical member, the openings being configured to receive the cylindrical barrel pin to couple the arms of said one of the first and second hinge members to the cylindrical barrel pin.

8. The hinge assembly of claim 7, wherein:

the arms of said one of the first and second hinge members and the cylindrical barrel pin are formed of metal; and further comprising:

at least one non-metal washer or bushing interposed between the arms of said one of the first and second hinge members and the cylindrical barrel pin so that no metal surfaces of the cylindrical member and the arms of said one of the first and second hinge members are in contact with one another.

9. The hinge assembly of claim 1, wherein:

the cylindrical member is formed as a tube having a central opening.

10. The hinge assembly of claim 1, wherein:

the ends of the cylindrical member are flared radially outward to facilitate retaining the hinge members upon the cylindrical member when the hinge members are coupled together upon the cylindrical member.

11. A set of hinges for pivotally coupling structures to one another, the set of hinges comprising:

at least two hinges, each hinge comprising:

a structural cylindrical member having a central axis;

first and second hinge members, each hinge member having an attachment body for coupling to a structure and a pair of laterally spaced apart opposite arms that project from the attachment body, each arm having an aperture for receiving the cylindrical member and rotatably and structurally coupling the hinge members together upon the cylindrical member so that the hinge members are rotatable about the central axis of the cylindrical member, the arms of each of the first and second hinge members being spaced apart the same distance, each arm of each hinge member having an outer face that faces away from the opposite arm and an inner face that faces the inner face of the opposite arm, and wherein the first and second hinge members are configured so that each arm of each hinge member interfaces with one arm of the other hinge member with the arms being in a staggered arrangement wherein the outer face of only one arm of each hinge member interfaces the inner face of only one arm of the other hinge member when the hinge members are coupled together upon the cylindrical member.

12. The set of hinges of claim 11, wherein:

the set of hinges are a set of garage door hinges; wherein the cylindrical member and arms of the hinge members are formed from metal; and further comprising:

at least one non-metal washer or bushing comprising a flat washer portion, an outer annular sleeve that projects from an outer face of the washer portion, and an inner annular sleeve that projects from an inner face of the washer portion, the outer annular sleeve projecting into the aperture of one of the arms of the hinge members and the inner annular sleeve projecting into the aperture of the other hinge member, wherein the at least one non-metal washer or bushing is interposed between the arms of the hinge members and the cylindrical member so that no metal surfaces of the cylindrical member and arms of the hinge members are in contact with one another.

13. The set of hinges of claim 11, wherein:

the set of hinges are a set of garage door hinges; wherein the arms of the hinge members are formed from metal; and further comprising:

at least one flat non-metal washer is interposed between each of the interfacing inner and outer faces of the arms of hinge members so that no metal surfaces of the interfacing arms of the hinge members are in contact with one another.

14. The set of hinges of claim 11, wherein:

the set of hinges are a set of garage door hinges; wherein the cylindrical member and arms of the hinge members are formed from metal; and further comprising:

at least one non-metal washer or bushing comprising a flat washer portion, an outer annular sleeve that projects from an outer face of the washer portion, and an inner annular sleeve that projects from an inner face of the washer portion, the outer annular sleeve projecting into the aperture of one of the arms of the hinge members and the inner annular sleeve projecting into the aperture of the other hinge member, wherein the at least one non-metal washer or bushing is interposed between the arms of the hinge members and the cylindrical member; and at least one flat non-metal washer interposed between each of the interfacing inner and outer faces of the arms of hinge members; and wherein the at least one non-metal washer or bushing and the at least one flat non-metal washer are configured so that no metal surfaces of the cylindrical member and arms of the hinge members are in contact with one another.

15. The set of hinges of claim 11, wherein:

one arm of each hinge member has an inner projecting collar that surrounds the cylindrical member when the hinge members are coupled together upon the cylindrical member.

16. The set of hinges of claim 11, wherein:

each hinge member has an identical configuration to the other hinge member in at least one of the at least two hinges.

17. The set of hinges of claim 11, further comprising:

a cylindrical barrel pin having a central opening for receiving a shaft of a garage door roller assembly, the cylindrical barrel pin being separate from the cylindrical member; and wherein in at least one of the at least two hinges the arms of one of the first and second hinge members are provided with openings that are laterally spaced from the apertures for receiving the cylindrical member, the openings being configured to receive the cylindrical barrel pin to couple the arms of said one of the first and second hinge members to the cylindrical barrel pin.

18. The set of hinges of claim 17, wherein:

the arms of said one of the first and second hinge members and the cylindrical barrel pin are formed of metal; and further comprising:

at least one non-metal washer or bushing interposed between the arms of said one of the first and second hinge members and the cylindrical barrel pin so that no metal surfaces of the cylindrical member and the arms of said one of the first and second hinge members are in contact with one another.

19. The hinge of claim 11, wherein:

the cylindrical member is formed as a tube having a central opening; and wherein the ends of the tube are flared radially outward to facilitate retaining the hinge members upon the cylindrical member when the hinge members are coupled together upon the cylindrical member.

20. A method of forming hinge for pivotally coupling structures to one another, the method comprising:

providing a cylindrical member having a central axis;

providing first and second hinge members, each hinge member having an attachment body for coupling to a structure and a pair of laterally spaced apart opposite arms that project from the attachment body, each arm having an aperture for receiving the cylindrical member and rotatably coupling the hinge members together upon the cylindrical member so that the hinge members are rotatable about the central axis of the cylindrical member, the arms of each of the first and second hinge members being spaced apart the same distance, each arm of each hinge member having an outer face that faces away from the opposite arm and an inner face that faces the inner face of the opposite arm;

arranging the first and second hinge members on the cylindrical member in a staggered configuration so that each arm of each hinge member interfaces with one arm of the other hinge member and wherein the outer face of only one arm of each hinge member interfaces the inner face of only one arm of the other hinge member when so arranged, the arms of the first and second hinge members being further arranged so that the apertures of the arms are generally aligned with one another;

inserting the cylindrical member through the aligned apertures of the arms of the hinge members so that the hinge members are coupled together upon the cylindrical member.

* * * * *